US012800911B2

(12) United States Patent
Wu et al.

(10) Patent No.: US 12,800,911 B2
(45) Date of Patent: Nov. 17, 2026

(54) OPTICAL MODULE

(71) Applicant: Actutek Corporation, Taoyuan City (TW)

(72) Inventors: Ya-Hsiu Wu, Taoyuan City (TW); Ying-Jen Wang, Taoyuan City (TW); Yi-Ho Chen, Taoyuan City (TW); Sin-Jhong Song, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 327 days.

(21) Appl. No.: 18/593,149

(22) Filed: Mar. 1, 2024

(65) Prior Publication Data

US 2024/0297562 A1 Sep. 5, 2024

Related U.S. Application Data

(60) Provisional application No. 63/449,410, filed on Mar. 2, 2023.

(51) Int. Cl.

| | |
|---|---|
| ***H02K 41/06*** | (2006.01) |
| ***G02B 7/18*** | (2021.01) |
| ***G02B 26/08*** | (2006.01) |
| ***G02B 27/64*** | (2006.01) |
| *G03B 5/00* | (2021.01) |
| *G03B 30/00* | (2021.01) |

(52) U.S. Cl.
CPC ....... *G02B 26/0883* (2013.01); *G02B 7/1805* (2013.01); *G03B 5/00* (2013.01); *G03B 30/00* (2021.01); *G03B 2205/003* (2013.01)

(58) Field of Classification Search
CPC .. G02B 26/0883; G02B 7/1805; G03B 30/00; G03B 5/00; G03B 2205/003
USPC .......................................................... 359/554
See application file for complete search history.

(56) References Cited

U.S. PATENT DOCUMENTS

2020/0336629 A1* 10/2020 Hu ....................... G02B 27/646

* cited by examiner

*Primary Examiner* — Bumsuk Won
*Assistant Examiner* — Grant A Gagnon
(74) *Attorney, Agent, or Firm* — MUNCY, GEISSLER, OLDS & LOWE, P.C.

(57) ABSTRACT

An optical module is provided. The optical module includes an immovable part, a movable part, and a connecting unit. The movable part is movable relative to the immovable part. The movable part is connected to an optical assembly. The movable part is movably connected to the immovable part via the connecting unit.

20 Claims, 11 Drawing Sheets

100

100

100

1100

OPTICAL MODULE

CROSS REFERENCE TO RELATED APPLICATIONS

This application claims priority of U.S. Provisional Application No. 63/449,410, filed on Mar. 2, 2023, the entirety of which is incorporated by reference herein.

BACKGROUND OF THE INVENTION

Field of the Invention

The present disclosure relates to an optical module, and, in particular, to an optical module includes an immovable part and a movable part that may be driven to move and/or tilt relative to the immovable part.

Description of the Related Art

With technological development, many electronic devices (such as cell phones, tablets, laptops, etc.) are currently equipped with optical modules including at least one optical assembly, where the optical assembly may be driven to achieve different functions. For example, when the optical assembly is a lens, the user may take photos or record videos. However, current optical modules occupy a large volume in at least two dimensions among three dimensions, which is disadvantageous for miniaturization of electronic devices.

BRIEF SUMMARY OF THE INVENTION

Some embodiments of the present disclosure provide an optical module. The optical module includes an immovable part, a movable part, and a connecting unit. The movable part is movable relative to the immovable part. The movable part is connected to an optical assembly. The movable part is movably connected to the immovable part via the connecting unit.

In some embodiments, the connecting unit includes a first connecting assembly and a second connecting assembly movably connected to the first connecting assembly. An arrangement direction along which the center of the first connecting assembly and the center of the second connecting assembly are arranged is parallel with a main axis. In some embodiments, the first connecting assembly includes a first connecting element movably connected to the second connecting assembly, a second connecting element movably connected to the second connecting assembly, and a third connecting element movably connected to the second connecting assembly. The first connecting element includes a first intermediate connecting portion movably connected to the second connecting assembly, a first immovable-part connecting-portion connected to the immovable part, and a first bent portion having a bent structure and located between the first intermediate connecting portion and the first immovable-part connecting-portion.

In some embodiments, the second connecting assembly includes a fourth connecting element movably connected to the first connecting element, a fifth connecting element movably connected to the second connecting element, and a sixth connecting element movably connected to the third connecting element. The fourth connecting element includes a fourth intermediate connecting portion movably connected to the first connecting element, a fourth movable-part connecting-portion connected to the movable part and a fourth bent portion having a bent structure and located between the fourth intermediate connecting portion and the fourth movable-part connecting-portion.

In some embodiments, both the first intermediate connecting portion and the fourth intermediate connecting portion are holes. In some embodiments, the optical module further includes a fastening element passing through the first intermediate connecting portion and the fourth intermediate connecting portion to connect the first connecting element to the fourth connecting element.

In some embodiments, the optical module further includes a circuit unit and a driving unit. The driving unit generates an electromagnetic driving force for driving the movable part to move relative to the immovable part. The driving unit includes a plurality of coils embedded in the circuit unit and a magnetic element disposed between the movable part and the immovable part, wherein the magnetic element corresponds to the plurality of coils. In some embodiments, the magnetic element is ring-shaped with a hollow, the magnetic element includes a N-pole and a S-pole, and an arrangement direction along which the N-pole and the S-pole are arranged is parallel with a main axis. In some embodiments, the optical module further includes a magnetically-permeable element disposed between the movable part and the immovable part. The magnetically-permeable element increases the electromagnetic driving force. In some embodiments, the magnetically-permeable element includes a plurality of holes.

In some embodiments, the immovable part includes a base and a plurality of stopper posts protruding from the base and surrounding a center of the base. The connecting unit includes a first connecting assembly, the first connecting assembly includes a plurality of connecting elements, and each of the plurality of connecting elements is located between adjacent two of the plurality of stopper posts. In some embodiments, the optical module further includes a plurality of extending elements. The base includes a plurality of holes, the plurality of extending elements are disposed in the plurality of holes, and the plurality of extending elements surround the plurality of stopper posts. In some embodiments, some of the plurality of extending elements are disposed on the inner side of the plurality of stopper posts, and the rest of the plurality of extending elements are disposed on the outer side of the plurality of stopper posts. In some embodiments, the number of the plurality of extending elements that are disposed on the inner side of the plurality of stopper posts is equal to the number of the plurality of extending elements that are disposed on the outer side of the plurality of stopper posts.

In some embodiments, the optical module further includes a driving unit, a circuit unit, and a sensing assembly. The driving unit includes a magnetic element disposed between the movable part and the immovable part. The sensing assembly is disposed on the circuit unit. The sensing assembly includes a first sensing element sensing the magnetic element and outputting a first sensing signal, a second sensing element sensing the magnetic element and outputting a second sensing signal, and a third sensing element sensing the magnetic element and outputting a first sensing signal. The movement of the movable part is obtained by the first sensing signal, the second sensing signal, and the third sensing signal.

In some embodiments, the movable part includes a movable part body and a movable part opening formed in the movable part body. In some embodiments, the size of the movable part opening is less than the size of the optical assembly.

Some embodiments of the present disclosure provide an optical module. The optical module includes an immovable part, a movable part, and a connecting unit. The movable part is movable relative to the immovable part. The connecting unit is disposed between the movable part and the immovable part. The connecting unit includes a first connecting assembly connected to the immovable part and a second connecting assembly connected to the movable part. The first connecting assembly is movably connected to the second connecting assembly, so the movable part is movably connected to the immovable part via the connecting unit.

In some embodiments, both the first connecting assembly and the second connecting assembly include a plurality of connecting elements, and the number of the plurality of connecting elements included in the first connecting assembly is equal to the number of the plurality of connecting elements included in the second connecting assembly. In some embodiments, each of the plurality of connecting elements includes a bent portion.

BRIEF DESCRIPTION OF THE DRAWINGS

The present disclosure may be more fully understood by reading the detailed description and examples with references made to the accompanying drawings. It should be noted that various features may be not drawn to scale. In fact, the dimensions of the various features may be arbitrarily increased or decreased for clarity of discussion, and the various features may be drawn schematically.

DETAILED DESCRIPTION OF THE INVENTION

The following description provides different embodiments, or examples, for implementing different features of the present disclosure. For example, the formation of a first feature "on" or "over" a second feature in the following description may include embodiments in which the first and second features are formed in direct contact, and may also include embodiments in which additional features may be formed between the first feature and the second feature, such that the first feature and the second feature are not in direct contact.

In addition, spatially relative terms such as "on" and "under" may be used to describe the relationship between an element (or a feature) and another element (or another feature). The spatially relative terms are intended to encompass different orientations of the devices in use or operation in addition to the orientation depicted in figures. The devices may be otherwise oriented (rotated 90 degrees or at other orientations), and the spatially relative terms used herein may likewise be interpreted accordingly. For example, if a device of the drawings is flipped upside down, an element that is "above" will become an element that is "below". Furthermore, ordinal terms such as "first", "second", etc., used in the description and claims do not by themselves connote any priority, precedence, or order of one element over another, but are used merely as labels to distinguish one element from another element having the same name.

In the following description, the terms "including", "comprising", "having", and the like should be interpreted as meaning "including but not limited to . . . ". Therefore, when the terms "including", "comprising", "having", and the like are used, the presence of corresponding features, regions, steps, operations and/or elements is specified, and without excluding the presence of other features, regions, steps, operations and/or elements.

Figure 1:
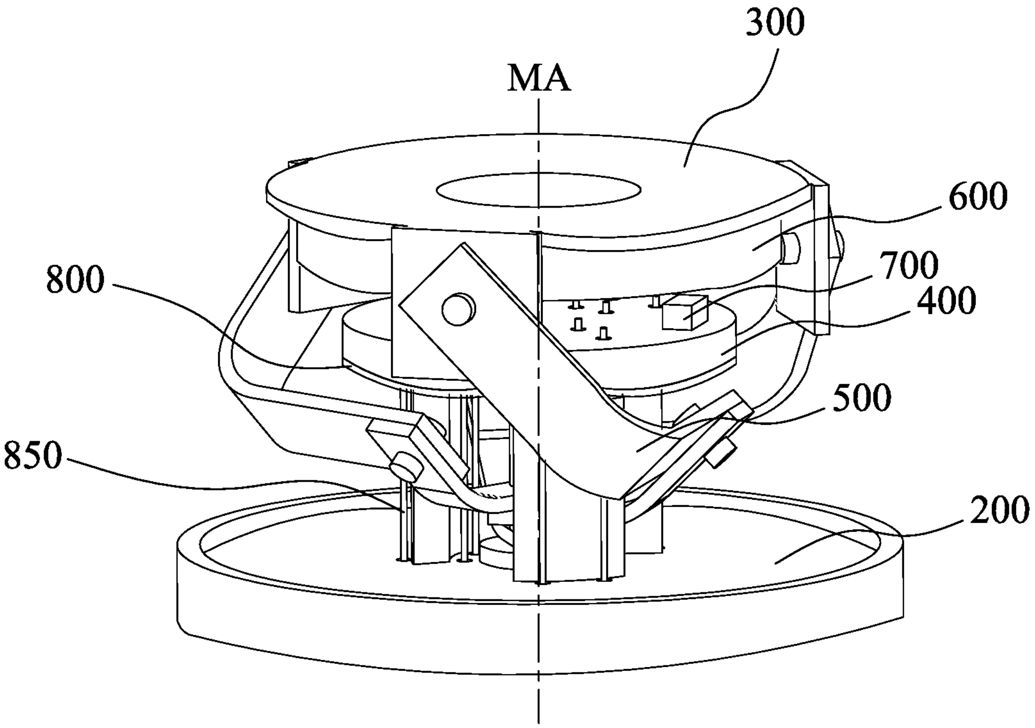
FIG. 1 and FIG. 2 are perspective views of the optical module, in accordance with some embodiments.
Figure 2:
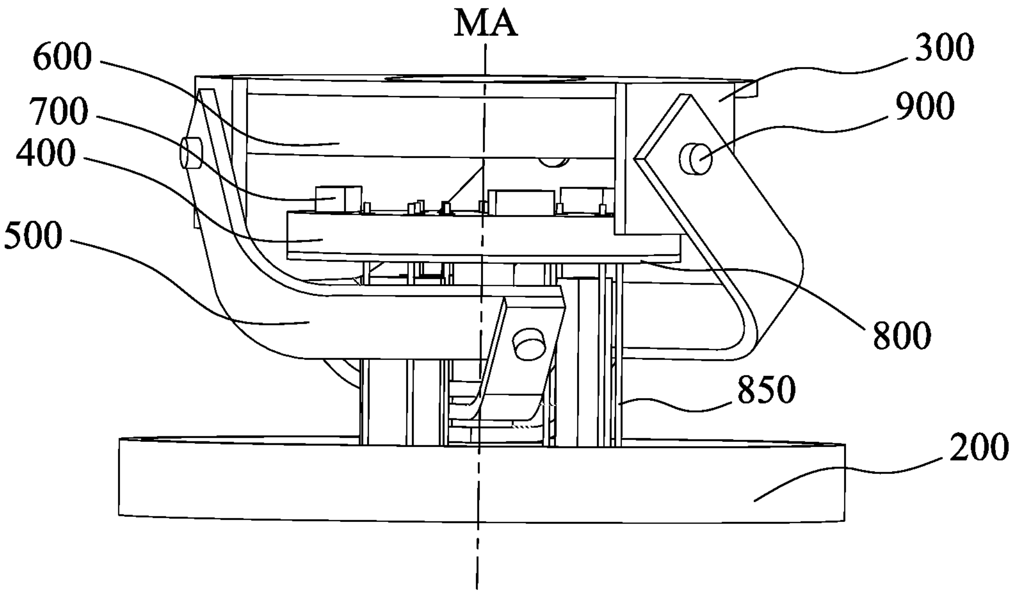
Figure 3:
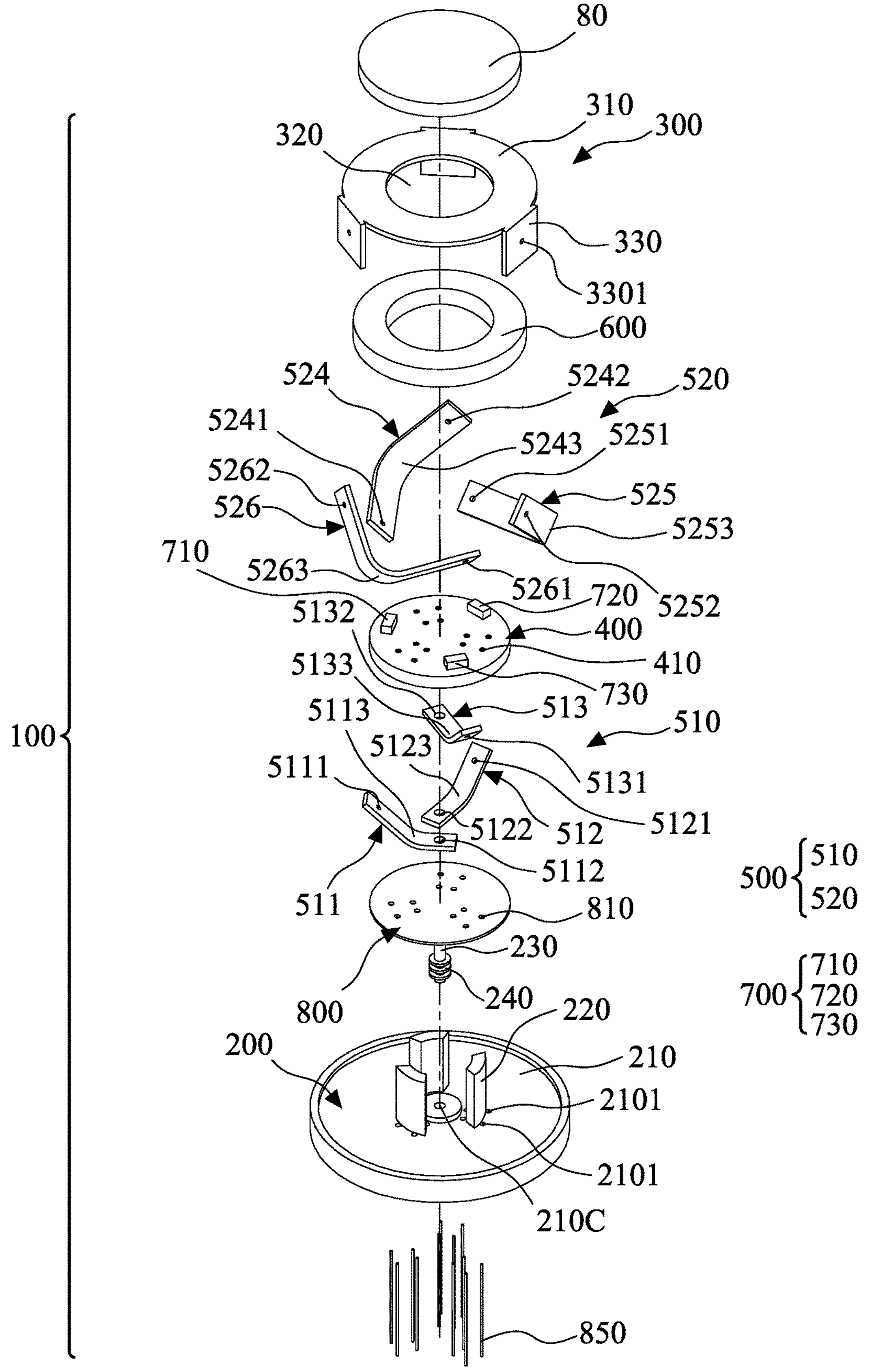
FIG. 3 is an exploded view of the optical module, in accordance with some embodiments

Some embodiments of the present disclosure provide an optical module 100. Please refer to FIG. 1 to FIG. 3. FIG. 1 and FIG. 2 are perspective views of an optical module 100, in accordance with some embodiments. FIG. 3 is an exploded view of the optical module 100, in accordance with some embodiments. In some embodiments, the optical module 100 includes an immovable part 200, a movable part 300, a circuit unit 400, a connecting unit 500, a driving unit 600, a sensing assembly 700, a magnetically-permeable element 800, a plurality of extending elements 850, and a plurality of fastening elements 900, but the elements included in the optical module 100 are not limited thereto. For ease of illustration, the central axis of the entire optical module 100 is defined as a main axis MA.

The immovable part 200 may include a base 210, a plurality of stopper posts 220, a fixing rod 230, and a plurality of fixing rings 240. The base 210 may include different shapes. In some embodiments, the base 210 may be a cuboid or a cylinder, but the shape of the base 210 is not limited thereto. In some embodiments, the base 210 includes a plurality of holes 2101 close to the stopper posts 220. The base 210 may include a center 210C. In some embodiments, there is circuit (not shown) formed in the base 210, and the circuit is formed in the base 210 by insert molding. The stopper posts 220 protrude from the base 210, and the stopper posts 220 surround the center 210C of the base 210. When viewed along the main axis MA, the size of the side of the stopper posts 220 that is close to the main axis MA is different from the size of the side of the stopper posts 220 that is away from the main axis MA. The fixing rod 230 may be disposed at the center 210C of the base 210. The fixing rings 240 may be used to affix the connecting unit 500 to the fixing rod 230.

The movable part 300 may be connected to an optical assembly 80. Specifically, the optical assembly 80 may be disposed on the top surface of the movable part 300. In some embodiments, the optical assembly 80 may include a lens, a mirror, a prism, a beam splitter, an aperture, a liquid lens, an image sensor, a camera module, a ranging module, a scanning element, etc., but the optical assembly 80 is not limited thereto. In some embodiments, the optical assembly 80 may be a voice coil motor, which includes an optical element and may have auto focus (AF) and/or optical image stabilization (OIS) function. The optical module 100 including the optical assembly 80 may be installed on an electronic device, such as a cell phone, a tablet computer, or a notebook, but the electronic device is not limited thereto.

The movable part 300 is disposed over the connecting unit 500. The movable part 300 is movably connected to the immovable part 200 via the connecting unit 500. That is, the movable part 300 is movable relative to the immovable part 200. In some embodiments, the movable part 300 includes a movable part body 310, a movable part opening 320, and three movable part bent portions 330. The movable part opening 320 is formed in the movable part body 310. In some embodiments, the size of the movable part opening 320 is designed to be slightly smaller than the size of the optical assembly 80 to be connected. Through the movable part opening 320, the overall weight of the optical module 100 may be reduced, which is advantageous for miniaturization of the optical module 100.

The three movable part bent portions 330 are bent downward and toward the immovable part 200 relative to the movable part body 310. In some embodiments, the three movable part bent portions 330 are spaced apart from each other by the same angle. That is, an angle between adjacent two of the three movable part bent portions 330 may be approximately 120 degrees (360 degrees divided by three). In some embodiments, each of the three movable part bent portions 330 includes a hole 3301. The number of movable part bent portions 330 may be determined and changed according to the degree of freedom of the movable part 300.

The circuit unit 400 is disposed between the movable part 300 and the immovable part 200. In some embodiments, the circuit unit 400 may include a plurality of holes 410. Other features of the circuit unit 400 will be described in detail in the following description regarding the driving unit 600.

Figure 4:
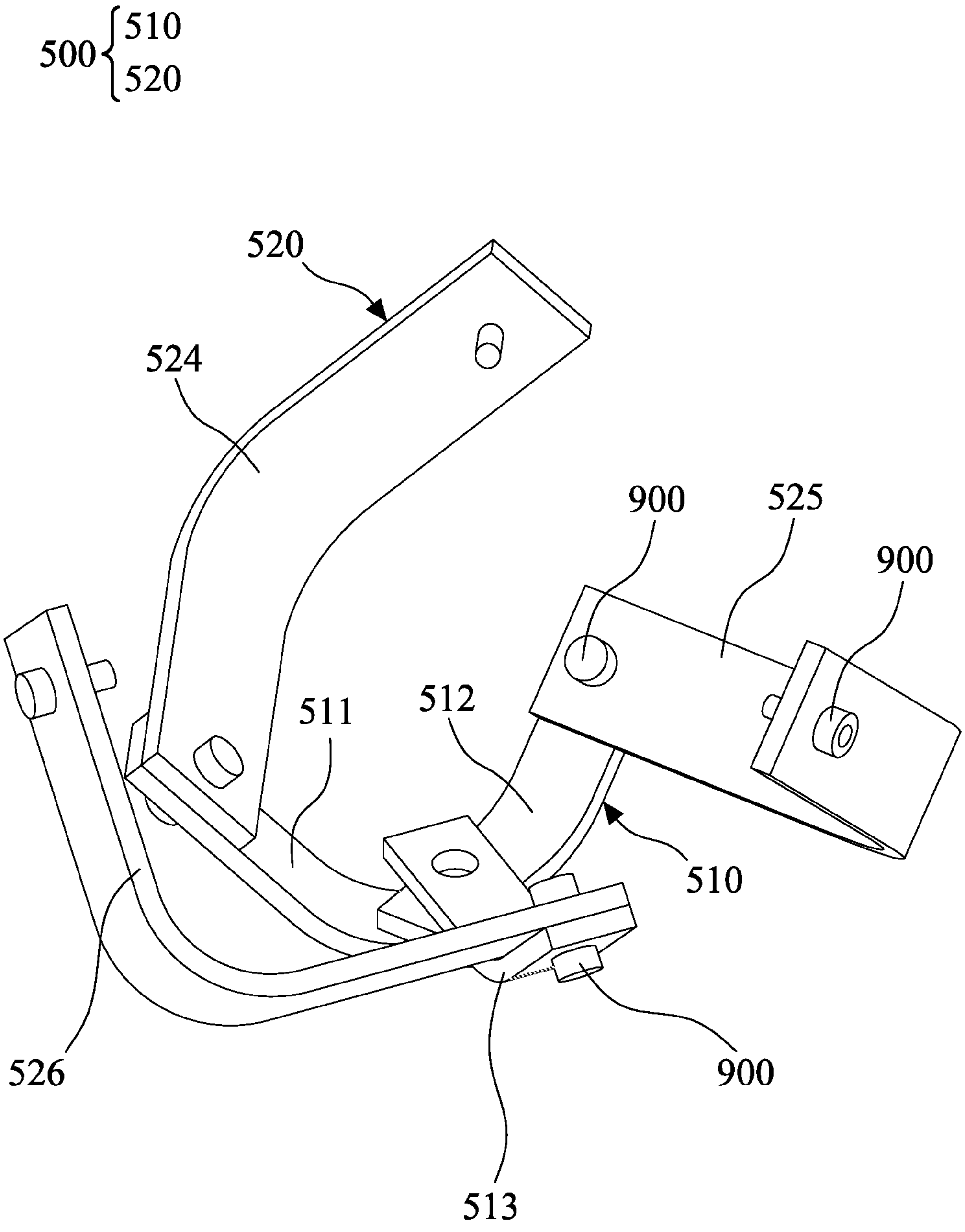
FIG. 4 is a schematic view of the connecting unit, in accordance with some embodiments.

Next, in addition to FIG. 1 to FIG. 3, please also refer to FIG. 4 to understand the connecting unit 500. FIG. 4 is a schematic view of the connecting unit 500, in accordance with some embodiments. The connecting unit 500 is disposed between the movable part 300 and the immovable part 200, making the movable part 300 movably connected to the immovable part 200. The connecting unit 500 includes a first connecting assembly 510 and a second connecting assembly 520. The second connecting assembly 520 is movably connected to the first connecting assembly 510. That is, the second connecting assembly 520 is movable relative to the first connecting assembly 510. The arrangement direction along which the center of the first connecting assembly 510 and the center of the second connecting assembly 520 are arranged is parallel with the main axis MA. When viewed along the main axis MA, at least one of the first connecting assembly 510 and the second connecting assembly 520 at least partially overlaps the optical assembly 80.

Since the first connecting assembly 510 and the second connecting assembly 520 are arranged along the main axis MA, the overall size of the optical module 100 in the directions perpendicular to the main axis MA may be reduced, and the sizes of at least two dimensions among three dimensions may be reduced. Therefore, miniaturization of the optical module 100 may be achieved. In addition, the first connecting assembly 510 and the second connecting assembly 520 may be made of materials that are less likely to generate particles or debris, so as to avoid the contact between the first connecting assembly 510 and the second connecting assembly 520 from generating particles or debris. In some embodiments, the first connecting assembly 510 and the second connecting assembly 520 are made of metal, such as stainless steel, but the materials of the first connecting assembly 510 and the second connecting assembly 520 are not limited thereto.

The first connecting assembly 510 is located between the second connecting assembly 520 and the immovable part 200. In some embodiments, the first connecting assembly 510 includes a first connecting element 511, a second connecting element 512, and a third connecting element 513. The first connecting element 511, the second connecting element 512, and the third connecting element 513 may have substantially the same shape, material, structure, etc. In some embodiments, each of the first connecting element 511, the second connecting element 512, and the third connecting element 513 is located between adjacent two of the stopper posts 220.

The first connecting element 511 includes a first intermediate connecting portion 5111, a first immovable-part connecting-portion 5112, and a first bent portion 5113. The first intermediate connecting portion 5111 is movably connected to the second connecting assembly 520. That is, the first intermediate connecting portion 5111 is movable relative to the second connecting assembly 520. In some embodiments, the first intermediate connecting portion 5111 is a hole. The first immovable-part connecting-portion 5112 is connected to the immovable part 200. In some embodiments, the first immovable-part connecting-portion 5112 is a hole, and the fixing rod 230 of the immovable part 200 passes through the first immovable-part connecting-portion 5112. The first bent portion 5113 has a bent structure, and the first bent portion 5113 is located between the first intermediate connecting portion 5111 and the first immovable-part connecting-portion 5112.

The second connecting element 512 includes a second intermediate connecting portion 5121, a second immovable-part connecting-portion 5122, and a second bent portion 5123. The second intermediate connecting portion 5121 is movably connected to the second connecting assembly 520. That is, the second intermediate connecting portion 5121 is movable relative to the second connecting assembly 520. In some embodiments, the second intermediate connecting portion 5121 is a hole. The second immovable-part connecting-portion 5122 is connected to the immovable part 200. In some embodiments, the second immovable-part connecting-portion 5122 is a hole, and the fixing rod 230 of the immovable part 200 passes through the second immovable-part connecting-portion 5122. The second bent portion 5123 has a bent structure, and the second bent portion 5123 is located between the second intermediate connecting portion 5121 and the second immovable-part connecting-portion 5122.

The third connecting element 513 includes a third intermediate connecting portion 5131, a third immovable-part connecting-portion 5132, and a third bent portion 5133. The third intermediate connecting portion 5131 is movably connected to the second connecting assembly 520. That is, the third intermediate connecting portion 5131 is movable relative to the second connecting assembly 520. In some embodiments, the third intermediate connecting portion 5131 is a hole. The third immovable-part connecting-portion 5132 is connected to the immovable part 200. In some embodiments, the third immovable-part connecting-portion 5132 is a hole, and the fixing rod 230 of the immovable part 200 passes through the third immovable-part connecting-portion 5132. The third bent portion 5133 has a bent structure, and the third bent portion 5133 is located between the third intermediate connecting portion 5131 and the third immovable-part connecting-portion 5132.

The first immovable-part connecting-portion 5112 is located below the second immovable-part connecting-portion 5122. The second immovable-part connecting-portion 5122 is located between the first immovable-part connecting-portion 5112 and the third immovable-part connecting-portion 5132. The third immovable-part connecting-portion 5132 is located on the second immovable-part connecting-portion 5122. In some embodiments, the three fixing rings 240 may pass through the fixing rod 230, and the three fixing rings 240 may be disposed on the first immovable-part connecting-portion 5112, the second immovable-part connecting-portion 5122, and the third immovable-part connecting-portion 5132, respectively, to strengthen the connection between the first connecting assembly 510 and the immovable part 200. In addition, it is advantageous for the first connecting element 511, the second connecting element 512, and the third connecting element 513 to rotate, using the fixing rod 230 as the rotation axis.

The second connecting assembly 520 is located between the movable part 300 and the first connecting assembly 510. In some embodiments, the second connecting assembly 520 includes a fourth connecting element 524, a fifth connecting element 525, and a sixth connecting element 526. The fourth connecting element 524, the fifth connecting element 525, and the sixth connecting element 526 may have substantially the same shape, material, structure, etc.

The fourth connecting element 524 includes a fourth intermediate connecting portion 5241, a fourth movable-part connecting-portion 5242, and a fourth bent portion 5243. The fourth intermediate connecting portion 5241 is movably connected to the first connecting assembly 510. That is, the fourth intermediate connecting portion 5241 is movable relative to the first connecting assembly 510. In some embodiments, the fourth intermediate connecting portion 5241 is a hole, and one of the fastening elements 900 passes through the fourth intermediate connecting portion 5241 and the first intermediate connecting portion 5111, so that the fourth connecting element 524 and the first connecting element 511 are connected to each other. The fourth movable-part connecting-portion 5242 is connected to the movable part 300. In some embodiments, the fourth movable-part connecting-portion 5242 is a hole, and one of the fastening elements 900 passes through the fourth movable-part connecting-portion 5242 and the corresponding hole 3301 of the movable part bent portions 330, so that the fourth movable-part connecting-portion 5242 is connected to the movable part 300. The fourth bent portion 5243 has a bent structure, and the fourth bent portion 5243 is located between the fourth intermediate connecting portion 5241 and the fourth movable-part connecting-portion 5242. The fastening elements 900 may be screws, bolts, etc.

The fifth connecting element 525 includes a fifth intermediate connecting portion 5251, a fifth movable-part connecting-portion 5252, and a fifth bent portion 5253. The fifth intermediate connecting portion 5251 is movably connected to the first connecting assembly 510. That is, the fifth intermediate connecting portion 5251 is movable relative to the first connecting assembly 510. In some embodiments, the fifth intermediate connecting portion 5251 is a hole, and one of the fastening elements 900 passes through the fifth intermediate connecting portion 5251 and the second intermediate connecting portion 5121, so that the fifth connecting element 525 and the second connecting element 512 are connected to each other. The fifth movable-part connecting-portion 5252 is connected to the movable part 300. In some embodiments, the fifth movable-part connecting-portion 5252 is a hole, and one of the fastening elements 900 passes through the fifth movable-part connecting-portion 5252 and the corresponding hole 3301 of the movable part bent portions 330, so that the fifth movable-part connecting-portion 5252 is connected to the movable part 300. The fifth bent portion 5253 has a bent structure, and the fifth bent portion 5253 is located between the fifth intermediate connecting portion 5251 and the fifth movable-part connecting-portion 5252.

The sixth connecting element 526 includes a sixth intermediate connecting portion 5261, a sixth movable-part connecting-portion 5262, and a sixth bent portion 5263. The sixth intermediate connecting portion 5261 is movably connected to the first connecting assembly 510. That is, the sixth intermediate connecting portion 5261 is movable relative to the first connecting assembly 510. In some embodiments, the sixth intermediate connecting portion 5261 is a hole, and one of the fastening elements 900 passes through the sixth intermediate connecting portion 5261 and the third intermediate connecting portion 5131, so that the sixth connecting element 526 and the third connecting element 513 are connected to each other. The sixth movable-part connecting-portion 5262 is connected to the movable part 300. In some embodiments, the sixth movable-part connecting-portion 5262 is a hole, and one of the fastening elements 900 passes through the sixth movable-part connecting-portion 5262 and the corresponding hole 3301 of the movable part bent portions 330, so that the sixth movable-part connecting-portion 5262 is connected to the movable part 300. The sixth bent portion 5263 has a bent structure, and the sixth bent portion 5263 is located between the sixth intermediate connecting portion 5261 and the sixth movable-part connecting-portion 5262.

Figure 5:
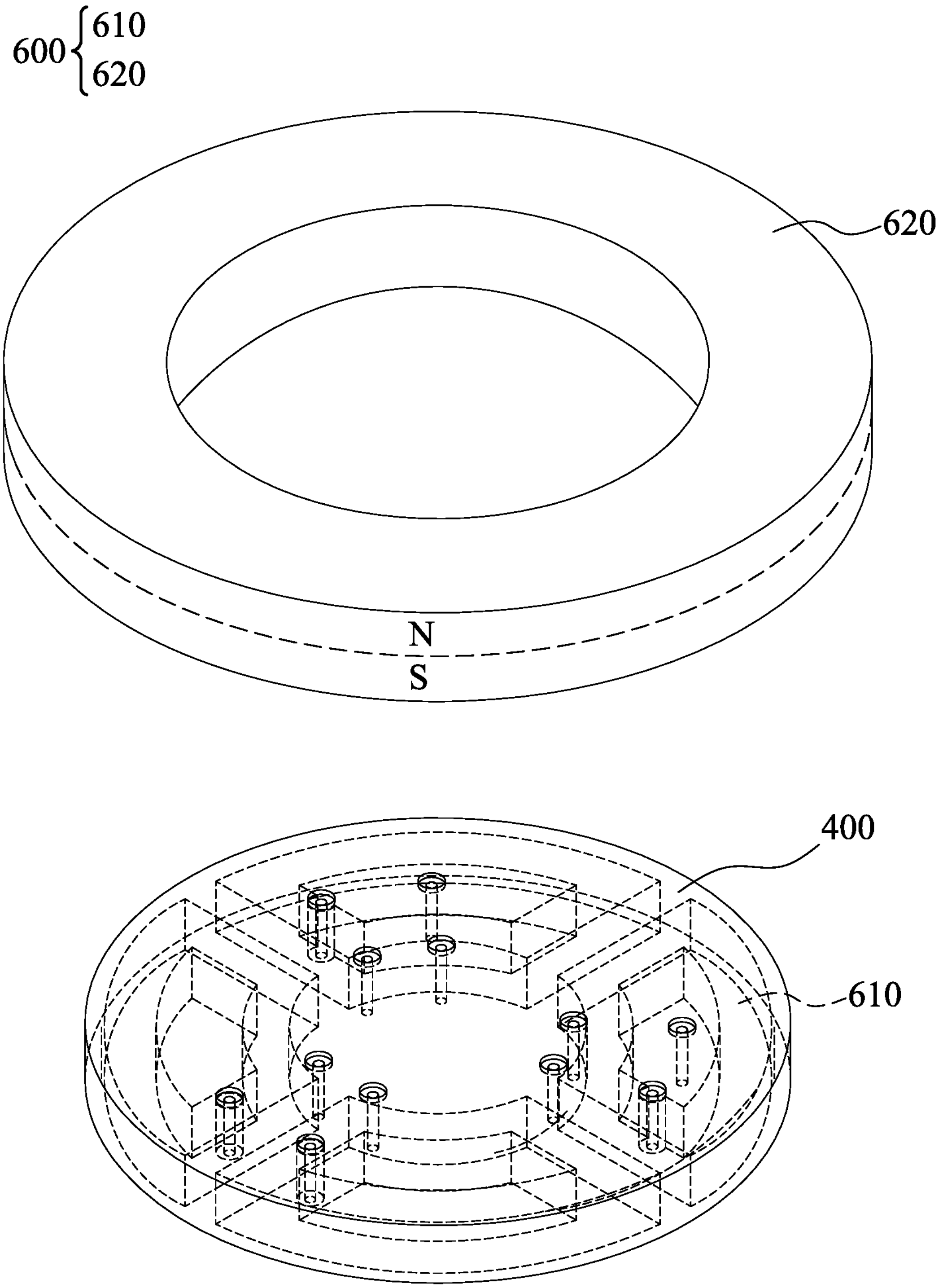
FIG. 5 is a schematic view of the circuit unit and the driving unit, in accordance with some embodiments.

Next, in addition to FIG. 1 to FIG. 3, please refer to FIG. 5 to understand the driving unit 600. FIG. 5 is a schematic view of the circuit unit 400 and the driving unit 600, in accordance with some embodiments. The driving unit 600 includes a plurality of coils 610 and a magnetic element 620. For ease of illustration, in FIG. 5, the coils 610 are shown in dotted lines. The coils 610 are embedded in the circuit unit 400. In some embodiments, the coils 610 and the circuit unit 400 are connected in the same process, and no assembly is required. That is, the coil 610 and the circuit unit 400 do not need to be connected through bonding, welding, etc., so the process may be simplified, the process complexity may be reduced, and the production cost may be reduced. In the art, the combination of coils 610 and circuit unit 400 may be referred to as "FP-coil". The coils 610 may have substantially the same shape, size, etc. In some embodiments, each of the coils 610 may have a sector-like shape. In some embodiments, each of coils 610 has substantially the same thickness.

The magnetic element 620 is disposed between the movable part 300 and the immovable part 200, and the magnetic element 620 corresponds to the coils 610. In some embodiments, the magnetic element 620 is disposed under the movable part body 310, and the bottom surface of the magnetic element 620 faces the top surfaces of the coils 610. In some embodiments, the magnetic element 620 is ring-shaped with a hollow. In some embodiments, the magnetic element 620 includes an N-pole and an S-pole, and the arrangement direction along which the N-pole and the S-pole are arranged is parallel with the main axis MA. The N-pole and the S-pole of the magnetic element 620 in FIG. 5 are only for illustration, and the N-pole and S-pole of the magnetic element 620 in FIG. 5 are interchangeable.

Through the electromagnetic force generated between the coils 610 and the magnetic element 620, the driving unit 600 may generate an electromagnetic driving force applied to the movable part 300. The magnitude and direction of the generated electromagnetic driving force may be controlled according to actual needs. For example, the direction of the electromagnetic driving force may depend on the direction of current flowing through the coils 610.

Next, please refer to FIG. 1 to FIG. 3 again to understand the sensing assembly 700. The sensing assembly 700 includes a first sensing element 710, a second sensing element 720, and a third sensing element 730. The first sensing element 710, the second sensing element 720, and the third sensing element 730 may be Hall sensors, Giant Magneto Resistance (GMR) sensors, Tunneling Magneto Resistance (TMR) sensors, etc. In some embodiments, the first sensing element 710, the second sensing element 720, and the third sensing element 730 are disposed on the circuit unit 400. In some embodiments, the first sensing element 710, the second sensing element 720, and the third sensing element 730 are spaced apart from each other by the same angle. That is, an angle between adjacent two of the first sensing element 710, the second sensing element 720, and the third sensing element 730 may be approximately 120 degrees (360 degrees divided by three).

Figure 6:
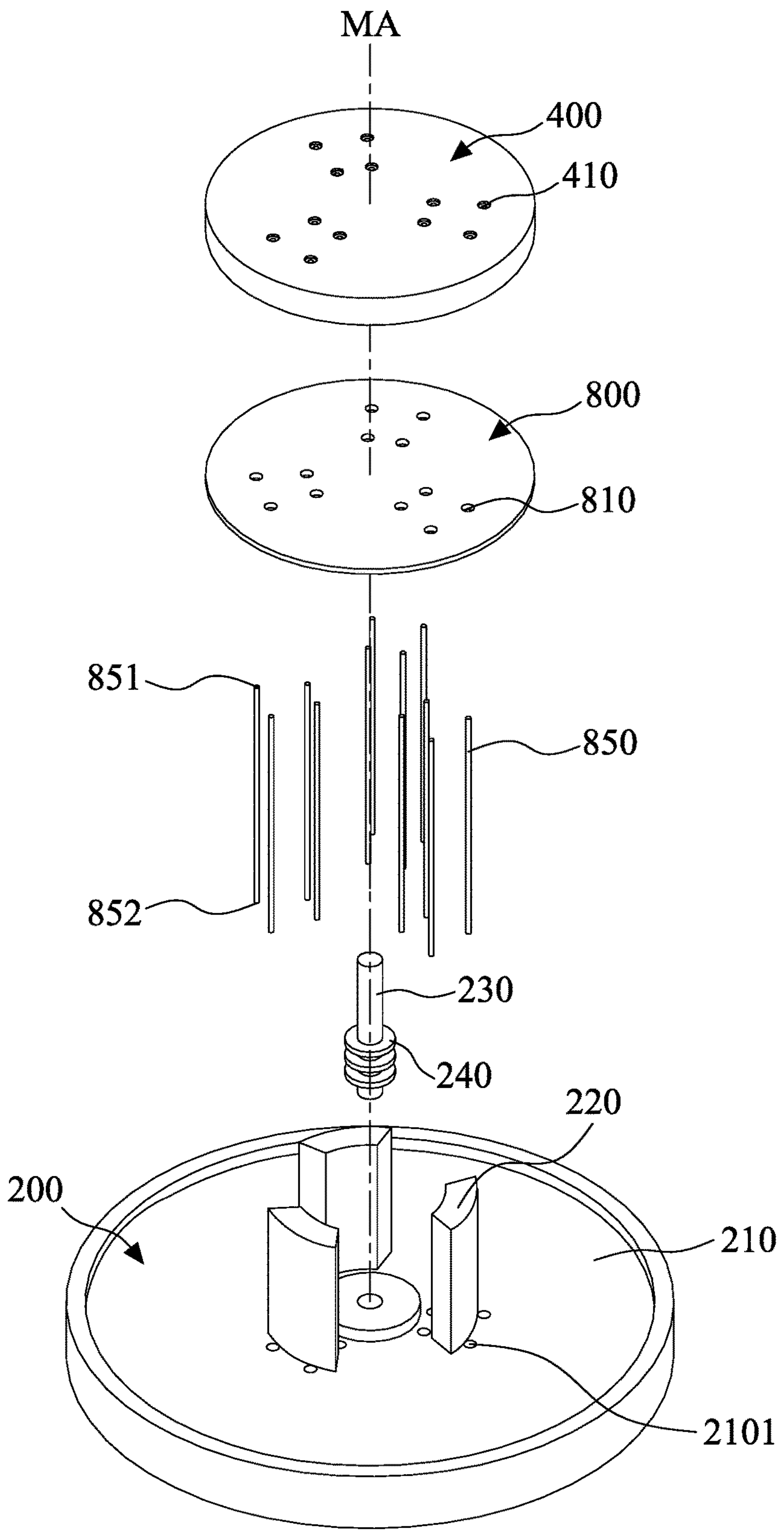
FIG. 6 is a schematic view of the immovable part, the circuit unit, the magnetically-permeable element, the extending elements, in accordance with some embodiments.
Figure 7A:
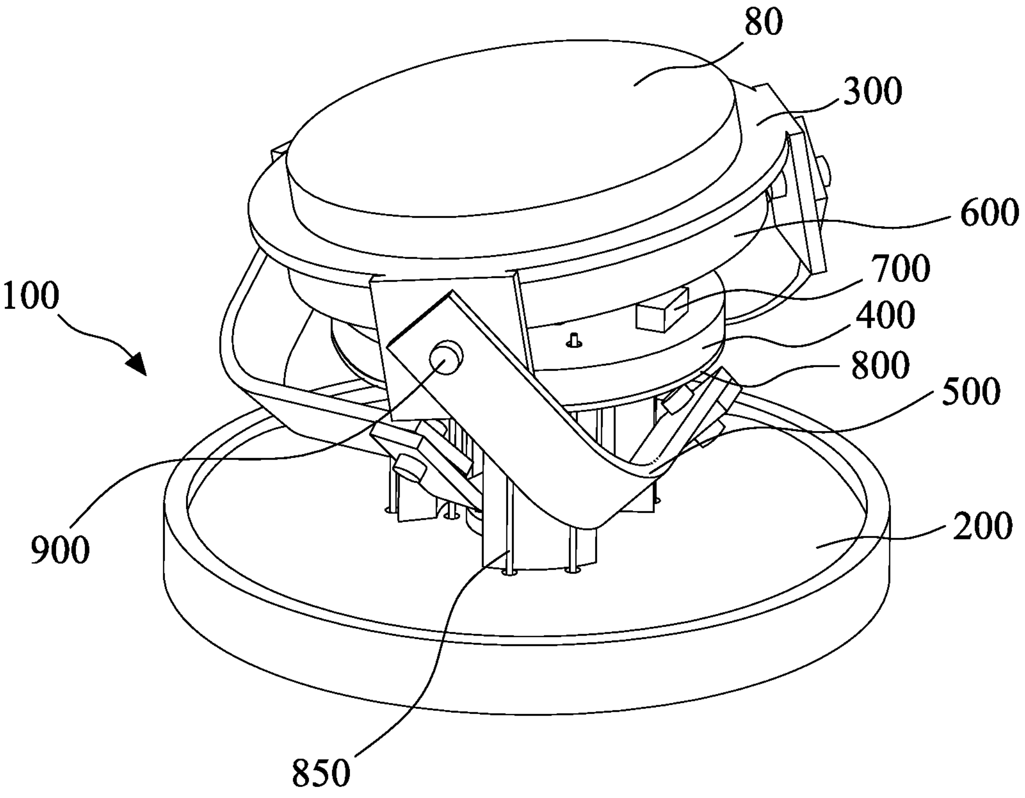
FIG. 7A to FIG. 7D are schematic views showing the movable part in a tilted position from different perspectives, in accordance with some embodiments.
Figure 7B:
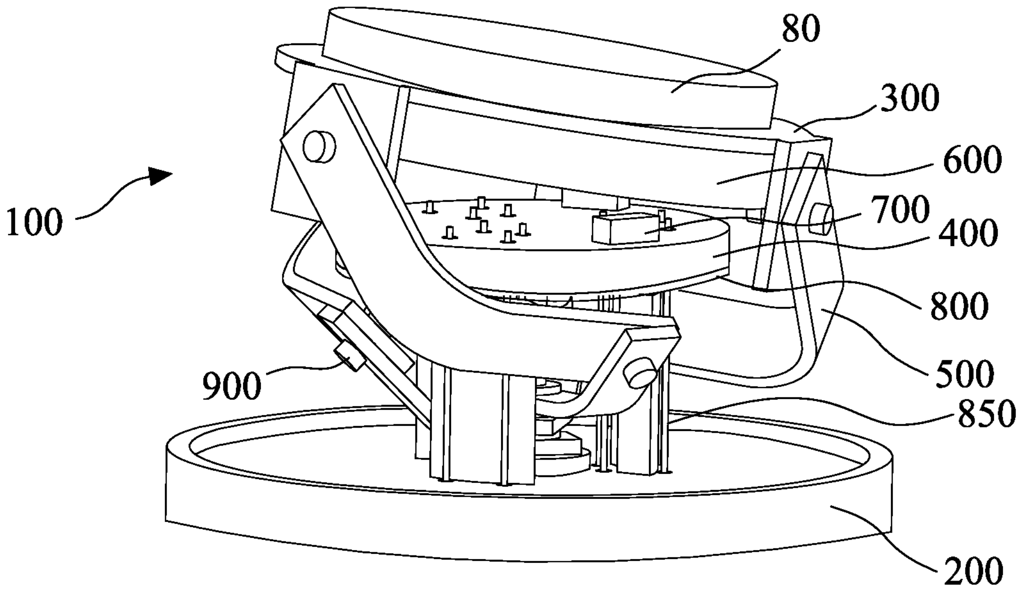
Figure 7C:
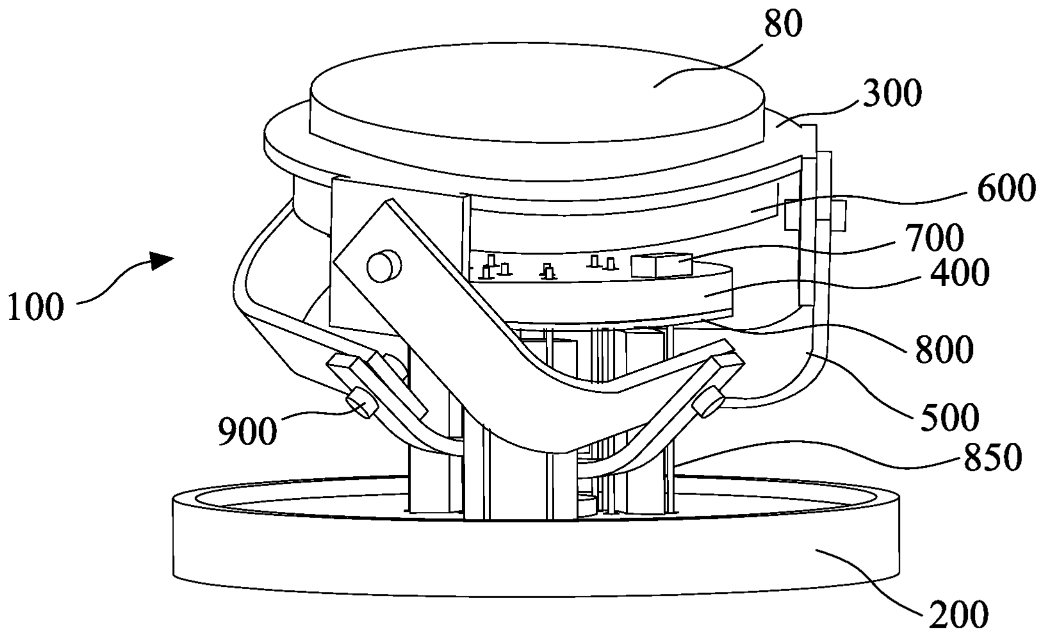
Figure 7D:
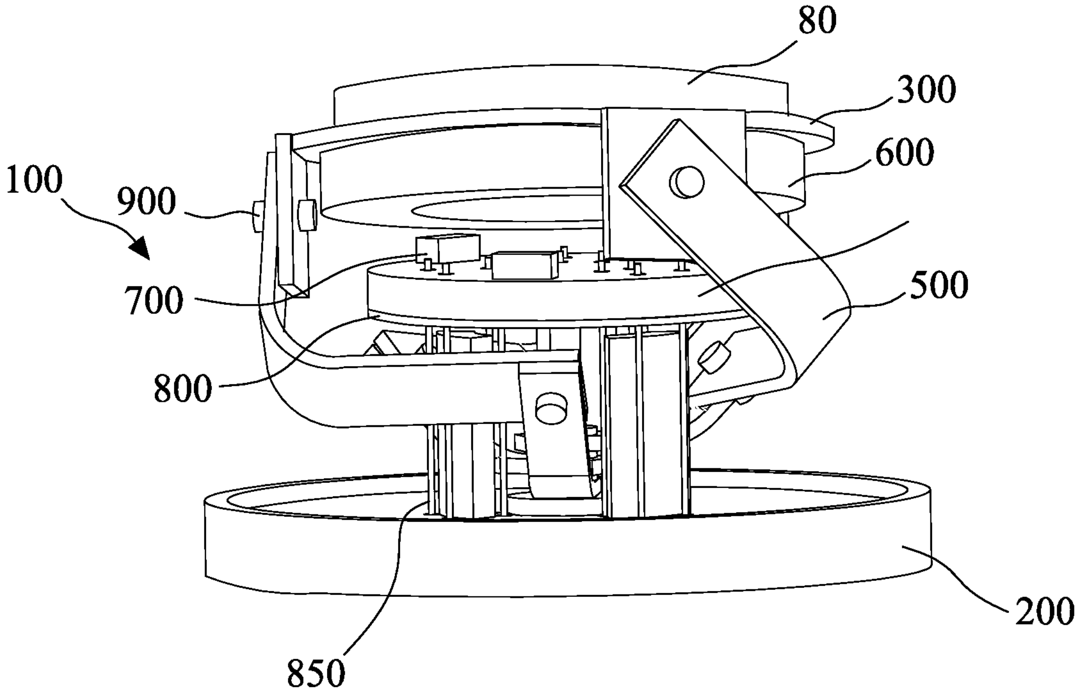

Next, in addition to FIG. 1 to FIG. 3, please refer to FIG. 6 to understand some other features of the optical module 100. FIG. 6 is a schematic view of the immovable part 200, the circuit unit 400, the magnetically-permeable element 800, the extending elements 850, in accordance with some embodiments. The magnetically-permeable element 800 is disposed between the movable part 300 and the immovable part 200. In some embodiments, the magnetically-permeable element 800 is in direct contact with the circuit unit 400. In some embodiments, the magnetically-permeable element 800 is made of a material with magnetic permeability, such as a ferromagnetic material, including iron (Fe), nickel (Ni), cobalt (Co), or an alloy thereof. In some embodiments, the magnetically-permeable element 800 is disk-shaped. In some embodiments, the magnetically-permeable element 800 may generate magnetic attraction force with the immovable part 200. In some embodiments, the magnetically-permeable element 800 may increase the electromagnetic driving force generated by the driving unit 600. In some embodiments, the magnetically-permeable element 800 may include a plurality of holes 810.

The extending elements 850 extend along the main axis MA and pass through the holes 410 of the circuit unit 400, the holes 810 of the magnetically-permeable element 800, and the holes 2101 of the base 210. In some embodiments, each of the extending elements 850 includes a top end 851 and a bottom end 852. The top end 851 is disposed in one of the holes 410 of the circuit unit 400, and the bottom end 852 is disposed in the one of the holes 2101 of the base 210. The extending elements 850 surround the stopper post 220. In the embodiment shown in FIG. 6, four extending elements 850 are viewed as a group. When viewed along the main axis MA, two of the extending elements 850 are on the inner side of the stopper posts 220, and the other two extending elements 850 are on the outer side of the stopper posts 220. In some embodiments, the extending elements 850 are made of a conductive material that is elastic. When viewed along a direction that is perpendicular to the main axis MA toward any of the stopper posts 220, the extending elements 850 at least partially overlap the stopper post 220, thereby reducing the possibility of a short circuit caused by the collision between the first connecting element 511, the second connecting element 512, and the third connecting element 513 with the extending elements 850.

Next, please refer to FIG. 1, FIG. 2, and FIG. 7A to FIG. 7D to understand how the movable part 300 moves relative to the immovable part 200. Due to the connecting unit 500 and the driving unit 600, the movable part 300 is movable relative to the immovable part 200. Specifically, the movable part 300 may be in any tilted position within the movement range. FIG. 7A to FIG. 7D are schematic views showing the movable part 300 in a tilted position from different perspectives, in accordance with some embodiments.

When it is desired to drive the movable part 300 to move relative to the immovable part 200, current may flow into the optical module 100, and the current may sequentially flow into the circuit in the base 210, the extending elements 850, and the circuit unit 400 and the coils 610 therein. An electromagnetic driving force is generated between the coils 610 and the magnetic element 620 to drive the movable part 300 to move relative to the immovable part 200. In some embodiments, when the movable part 300 is tilted, the stopper posts 220 may reduce the possibility of collision between the first connecting element 511, the second connecting element 512, and the third connecting element 513 with the extending elements 850.

The movement of the movable part 300 may make the connecting unit 500 move. Specifically, the movement of the movable part 300 may make the second connecting assembly 520 move, and the movement of the second connecting assembly 520 may further make the first connecting assembly 510 move. Since the movable part 300 is connected to the second connecting assembly 520, the second connecting assembly 520 is connected to the first connecting assembly 510, and the first connecting assembly 510 is connected to the immovable part 200, so that the degree of freedom of the movable part 300 may be restricted by the first connecting assembly 510 and the second connecting assembly 520. Therefore, the movable part 300 may move relative to the immovable part 200 stably within the movement range.

For ease of illustration, the plane where the first intermediate connecting portion 5111, the second intermediate connecting portion 5121, and the third intermediate connecting portion 5131 are located is defined as an intermediate imaginary plane. In addition, the plane where the fourth movable-part connecting-portion 5242, the fifth movable-part connecting-portion 5252, and the sixth movable-part connecting-portion 5262 are located is defined as a movable part imaginary plane.

When the movable part 300 is in the initial position (that is, the movable part 300 is not tilted, as shown in FIG. 1 and FIG. 2), the intermediate imaginary plane is perpendicular to the main axis MA, and the movable part imaginary plane is also perpendicular to the main axis MA. The normal direction of the top surface of the movable part 300 is parallel with the main axis MA. When the movable part 300 is in a tilted position (that is, when the movable part 300 is tilted, as shown in FIG. 6A to FIG. 6D), the movable part imaginary plane is perpendicular to a tilt axis, and the tilt axis is not parallel with the main axis MA. There is an angle between the normal direction of the top surface of the movable part 300 and the main axis MA.

In addition, since the degree of freedom of the movable part 300 is restricted, the movable part 300 may move relative to the immovable part 200 to the limit in three limit positions, which are respectively defined as a first limit position, a second limit position, and a third limit position. In some embodiments, by changing the angle or lengths of the first bent portion 5113, the second bent portion 5123, the third bent portion 5133, the fourth bent portion 5243, the fifth bent portion 5253, and the sixth bent portion, the limit positions where the movable part 300 moves relative to the immovable part 200 to the limit may be changed. It should be noted that, although FIG. 7A to FIG. 7D are schematic views showing the movable part 300 in a certain tilted position, a person skilled in the art should be able to infer how the movable part 300 may be in any position within the movement range because different perspectives are shown.

When the movable part 300 is tilted, the sensing assembly 700 may sense the movement and/or the position of the movable part 300. In some embodiments, the first sensing element 710, the second sensing element 720, and the third sensing element 730 may sense changes in magnetic field lines (including but not limited to magnetic field density and magnetic field direction) of the magnetic element 620 to determine the distances between the first sensing element 710 and the magnetic element 620, between the second sensing element 720 and the magnetic element 620, and between the third sensing element 730 and the magnetic element 620. In addition, the first sensing element 710, the second sensing element 720, and the third sensing element 730 may output a first sensing signal, a second sensing signal, and a third sensing signal, respectively. The movement of the movable part 300 may be obtained by the first sensing signal, the second sensing signal, and the third sensing signal.

In some embodiments, the optical module 100 further includes a database. The database may record the movement of the movable part 300 relative to the immovable part 200. The database may include reference information, first limit information, second limit information, and third limit information. The reference information records the first sensing signal, the second sensing signal, and the third sensing signal under the circumstance that the movable part 300 is in the initial position. The first limit information records the first sensing signal, the second sensing signal, and the third sensing signal under the circumstance that the movable part 300 is in the first limit position relative to the immovable part 200. The second limit information records the first sensing signal, the second sensing signal, and the third sensing signal under the circumstance that the movable part 300 is in the second limit position relative to the immovable part 200. The third limit information records the first sensing signal, the second sensing signal, and the third sensing signal under the circumstance that the movable part 300 is in the third limit position relative to the immovable part 200.

For example, when the movable part 300 is in the initial position, the top surface of the movable part 300 is substantially perpendicular to the main axis MA, and the first sensing signal, the second sensing signal, and the third sensing signal may be recorded in a relative manner that the sensed angles are recorded as 0 degrees, 0 degrees, and 0 degrees. However, the first sensing signal, the second sensing signal, and the third sensing signal may also be recorded in an actual manner that the sensed angles are recorded by their absolute angles.

When the movable part 300 is in the first limit position, the first sensing signal, the second sensing signal, and the third sensing signal may be recorded in a relative manner that the sensed angles are recorded as 0 degrees, +X degrees, and −X degrees. When the movable part 300 is in the second limit position, the first sensing signal, the second sensing signal, and the third sensing signal may be recorded in a relative manner that the sensed angles are recorded as −X degrees, 0 degrees, and +X degrees. When the movable part 300 is in the third limit position, the first sensing signal, the second sensing signal, and the third sensing signal may be recorded in a relative manner that the sensed angles are recorded as +X degrees, −X degrees, and 0 degrees. In this paragraph, ±X degrees represent the relative angle where the movable part 300 moves relative to the immovable part 200 to the limit.

Before the optical module 100 is operated, a calibration procedure may be performed by the driving unit 600 based on the database to make sure that the movable part 300 moves normally. The calibration procedure includes making the movable part 300 move to the initial position, the first limit position, the second limit position, and the third limit position and confirming whether the sensed first sensing signal, the sensed second sensing signal, and the sensed third sensing signal are consistent with those stored in the database.

It should be noted that the number of coils and/or sensing elements may be determined and changed according to the degree of freedom of the movable part 300. Under the circumstance where the movable part 300 has three degrees of freedom, only at least three coils are required to ensure that the movable part 300 may be tilted at any angle relative to the immovable part 200 within the movement range, and only at least three sensing elements are also required to obtain the movement of the movable part 300. Increasing the number of coils may further improve the precision of the tilt generated by the movable part 300. Increasing the number of sensing elements may further improve sensing accuracy. The configuration of the coils and/or the sensing elements may be adjusted according to actual needs.

Figure 8:
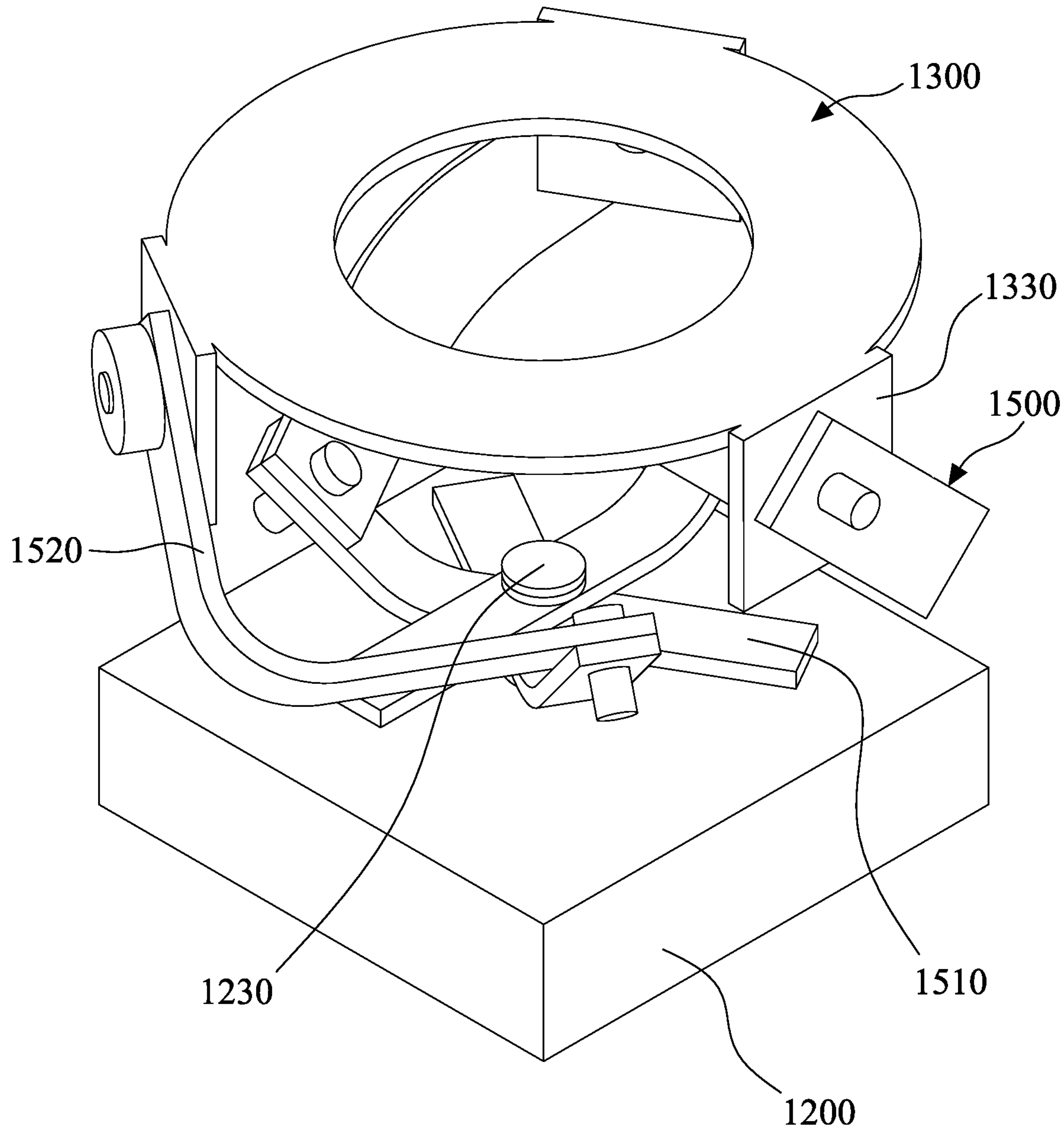
FIG. 8 is a schematic view of another optical module, in accordance with some embodiments.

Next, please refer to FIG. 8. FIG. 8 is a schematic view of another optical module 1100, in accordance with some embodiments. The optical module 1100 includes an immovable part 1200, a movable part 1300, and a connecting unit 1500. The immovable part 1200 includes a fixing rod 1230. The movable part 1300 includes a plurality of movable part bent portions 1330. The connecting unit 1500 is disposed between the movable part 1300 and the immovable part 1200. The connecting unit 1500 includes a first connecting assembly 1510 and a second connecting assembly 1520. The first connecting assembly 1510 includes a plurality of connecting elements connected to the fixing rod 1230 of the immovable part 1200. The second connecting assembly 1520 includes a plurality of connecting elements connected to the movable part bent portions 1330 of the movable part 1300. Moreover, the first connecting assembly 1510 and the second connecting assembly 1520 are connected to each other.

In the embodiment shown in FIG. 8, the driving unit is not shown. However, the optical module 1100 may be provided with any driving unit. For example, the driving unit may include a combination of coils and a magnetic element as described above, or, the driving unit may include a piezoelectric element, or, the driving unit may include a shape memory alloy (SMA), and the like. In some embodiments, the driving unit may directly drive the movable part 1300 to move, the movement of the movable part 1300 may make the second connecting assembly 1520 move, and the movement of the second connecting assembly 1520 may further make the first connecting assembly 1510 move (for example, the first connecting assembly 1510 may rotate, using the fixing rod 1230 as the rotation axis). In some embodiments, the driving unit may directly drive the first connecting assembly 1510 to move, the movement of the first connecting assembly 1510 may make the second connecting assembly 1520 move, and the movement of the second connecting assembly 1520 may further make the movable part 1300 to move (e.g., being tilted). The elements driven by the driving unit may be determined based on actual needs.

In addition, the optical module 100 and the optical module 1100 may have other applications. For example, eye-tracking technology has developed rapidly in recent years. Advertisers may decide the content of advertisements based on how long consumers look at advertisements. Users of electronic devices may control electronic devices through eye movements. Eye tracking technology usually illuminates the eyeball or a specific area via multiple emitting elements (for example, light sources) to generate a pattern for identifying the position of the eyeball, and requires reflective elements to reflect the pattern on the eyeball or a specific area. The optical module 100 and the optical module 1100 may be used to be connected to the reflective elements, changing the positions of the movable part 300 and the movable part 1300 and the connected reflective elements according to the moving eyeball. That is, in addition to the electronic devices described above, the optical module 100 and the optical module 1100 may be used for head-mounted display (HMD), especially head-mounted display using virtual reality (VR) technology, augmented reality (AR) technology, and the like.

Some embodiments of the present disclosure provide an optical module. The optical module includes an immovable part, a movable part, a connecting unit, and a driving unit. The connecting unit includes a first connecting assembly and a second connecting assembly that are connected to each other. Since the first connecting assembly and the second connecting assembly are arranged along the main axis, the overall size of the optical module in the directions perpendicular to the main axis may be reduced, and the volume in at least two dimensions among three dimensions may be reduced. Therefore, miniaturization of the optical module may be achieved. The driving unit may drive the movable part and the connected optical assembly to be tilted relative to the immovable part. Furthermore, the connecting unit may restrict the degree of freedom of the movable part, so the movable part may move stably. In addition, the optical module may include a sensing assembly, and an suitable database may be created to perform a calibration procedure.

The foregoing outlines features of several embodiments, so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. In addition, the scope of the present disclosure is not limited to the specific embodiments, and the combination of various claims and embodiments is within the scope of the present disclosure.

What is claimed is:

1. An optical module, comprising:

an immovable part;

a movable part movable relative to the immovable part, wherein the movable part is connected to an optical assembly; and a connecting unit comprising a first connecting assembly and a second connecting assembly movably connected to the first connecting assembly, wherein an arrangement direction along which a center of the first connecting assembly and a center of the second connecting assembly are arranged is parallel with a main axis, wherein the movable part is movably connected to the immovable part via the connecting unit, wherein the first connecting assembly comprises:

a first connecting element movably connected to the second connecting assembly;

a second connecting element movably connected to the second connecting assembly; and a third connecting element movably connected to the second connecting assembly, wherein the first connecting element comprises:

a first intermediate connecting portion movably connected to the second connecting assembly;

a first immovable-part connecting-portion connected to the immovable part; and a first bent portion having a bent structure and located between the first intermediate connecting portion and the first immovable-part connecting-portion, wherein the second connecting assembly comprises:

a fourth connecting element movably connected to the first connecting element;

a fifth connecting element movably connected to the second connecting element; and a sixth connecting element movably connected to the third connecting element, wherein the fourth connecting element comprises:

a fourth intermediate connecting portion movably connected to the first connecting element;

a fourth movable-part connecting-portion connected to the movable part; and a fourth bent portion having a bent structure and located between the fourth intermediate connecting portion and the fourth movable-part connecting-portion.

2. The optical module as claimed in claim 1, wherein both the first intermediate connecting portion and the fourth intermediate connecting portion are holes.

3. The optical module as claimed in claim 2, further comprising a fastening element passing through the first intermediate connecting portion and the fourth intermediate connecting portion to connect the first connecting element to the fourth connecting element.

4. The optical module as claimed in claim 1, further comprising a circuit unit and a driving unit, wherein the driving unit generates an electromagnetic driving force for driving the movable part to move relative to the immovable part, and the driving unit comprises:

a plurality of coils embedded in the circuit unit; and a magnetic element disposed between the movable part and the immovable part, wherein the magnetic element corresponds to the plurality of coils.

5. The optical module as claimed in claim 4, wherein the magnetic element is ring-shaped with a hollow, the magnetic element comprises a N-pole and a S-pole, and an arrangement direction along which the N-pole and the S-pole are arranged is parallel with the main axis.

6. The optical module as claimed in claim 4, further comprising a magnetically-permeable element disposed between the movable part and the immovable part, wherein the magnetically-permeable element increases the electromagnetic driving force.

7. The optical module as claimed in claim 6, wherein the magnetically-permeable element comprises a plurality of holes.

8. The optical module as claimed in claim 1, wherein the immovable part comprises:

a base; and a plurality of stopper posts protruding from the base and surrounding a center of the base, wherein each of the first connecting element, the second connecting element, and the third connecting element is located between adjacent two of the plurality of stopper posts.

9. The optical module as claimed in claim 8, further comprising a plurality of extending elements, wherein the base comprises a plurality of holes, the plurality of extending elements are disposed in the plurality of holes, and the plurality of extending elements surround the plurality of stopper posts.

10. The optical module as claimed in claim 9, wherein some of the plurality of extending elements are disposed on an inner side of the plurality of stopper posts, and the rest of the plurality of extending elements are disposed on an outer side of the plurality of stopper posts.

11. The optical module as claimed in claim 10, wherein the number of the plurality of extending elements that are disposed on the inner side of the plurality of stopper posts is equal to the number of the plurality of extending elements that are disposed on the outer side of the plurality of stopper posts.

12. The optical module as claimed in claim 1, further comprising a driving unit, a circuit unit, and a sensing assembly, wherein the driving unit comprises a magnetic element disposed between the movable part and the immovable part, the sensing assembly is disposed on the circuit unit, and the sensing assembly comprises:

a first sensing element sensing the magnetic element and outputting a first sensing signal;

a second sensing element sensing the magnetic element and outputting a second sensing signal; and a third sensing element sensing the magnetic element and outputting a first sensing signal;

wherein the movement of the movable part is obtained by the first sensing signal, the second sensing signal, and the third sensing signal.

13. The optical module as claimed in claim 1, wherein the movable part comprises a movable part body and a movable part opening formed in the movable part body.

14. The optical module as claimed in claim 13, wherein a size of the movable part opening is less than a size of the optical assembly.

15. An optical module, comprising:

an immovable part;

a movable part movable relative to the immovable part; and a connecting unit disposed between the movable part and the immovable part, comprising:

a first connecting assembly connected to the immovable part, wherein the first connecting assembly comprises a plurality of lower connecting elements, and each of the plurality of lower connecting elements has substantially the same shape, material, and structure; and a second connecting assembly connected to the movable part, wherein the first connecting assembly is movably connected to the second connecting assembly, so the movable part is movably connected to the immovable part via the connecting unit.

16. The optical module as claimed in claim 15, wherein the second connecting assembly comprise a plurality of upper connecting elements, and the number of the plurality of lower connecting elements included in the first connecting assembly is equal to the number of the plurality of upper connecting elements included in the second connecting assembly.

17. The optical module as claimed in claim 16, wherein the plurality of lower connecting elements and the plurality of upper connecting elements each comprises a bent portion.

18. The optical module as claimed in claim 15, wherein the second connecting assembly comprises at least three upper connecting elements, and each of the at least three upper connecting elements has substantially the same shape, material, and structure.

19. The optical module as claimed in claim 15, wherein the first connecting assembly is located between the second connecting assembly and the immovable part, and the second connecting assembly is located between the movable part and the first connecting assembly.

20. The optical module as claimed in claim 15, wherein the movable part is connected to an optical assembly, and at least one of the first connecting assembly and the second connecting assembly at least partially overlaps the optical assembly.

* * * * *